United States Patent [19]

LaRou

[11] Patent Number: 4,673,302
[45] Date of Patent: Jun. 16, 1987

[54] DOUBLE ROW CYLINDRICAL EXPANSION BEARING

[75] Inventor: Albert M. LaRou, Naperville, Ill.

[73] Assignee: Emerson Electric Co., St. Louis, Mo.

[21] Appl. No.: 880,044

[22] Filed: Jun. 30, 1986

[51] Int. Cl.[4] .................. F16C 19/28; F16C 19/52; F16C 25/08

[52] U.S. Cl. ........................... 384/548; 384/557; 384/558

[58] Field of Search ............ 384/557, 558, 564, 569, 384/493, 495–498, 905

[56] References Cited

U.S. PATENT DOCUMENTS

| | | | |
|---|---|---|---|
| 2,324,676 | 7/1943 | Butterfield | 384/557 X |
| 3,807,819 | 4/1974 | Zimmer et al. | |
| 3,845,999 | 11/1974 | Zimmer et al. | |
| 3,850,485 | 11/1974 | Zimmer et al. | |
| 4,595,302 | 6/1986 | Attinger et al. | 384/558 |

FOREIGN PATENT DOCUMENTS

| | | | |
|---|---|---|---|
| 2745842 | 4/1979 | Fed. Rep. of Germany | 384/564 |
| 176024 | 3/1922 | United Kingdom | 384/558 |
| 766170 | 1/1957 | United Kingdom | 384/564 |
| 1127975 | 9/1968 | United Kingdom | 384/558 |

Primary Examiner—Stuart S. Levy
Assistant Examiner—Thomas R. Hannon
Attorney, Agent, or Firm—Aubrey L. Burgess

[57] ABSTRACT

A double row cylindrical expansion bearing assembly in which a recessed cylindrical outer raceway has an axial length substantially the same as the axial length of the double row of rollers and the inner race has a raceway of an axial length in excess of that of the outer raceway.

5 Claims, 4 Drawing Figures

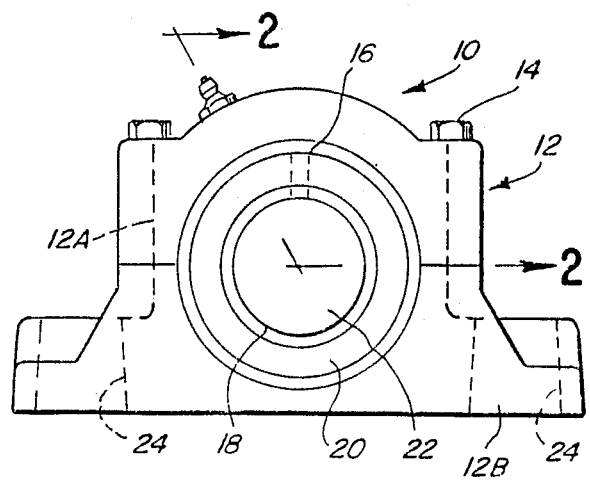
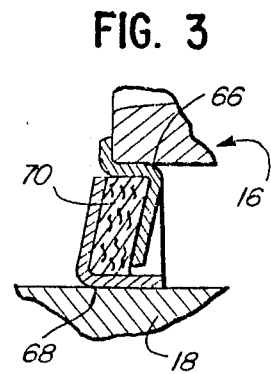
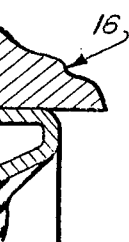
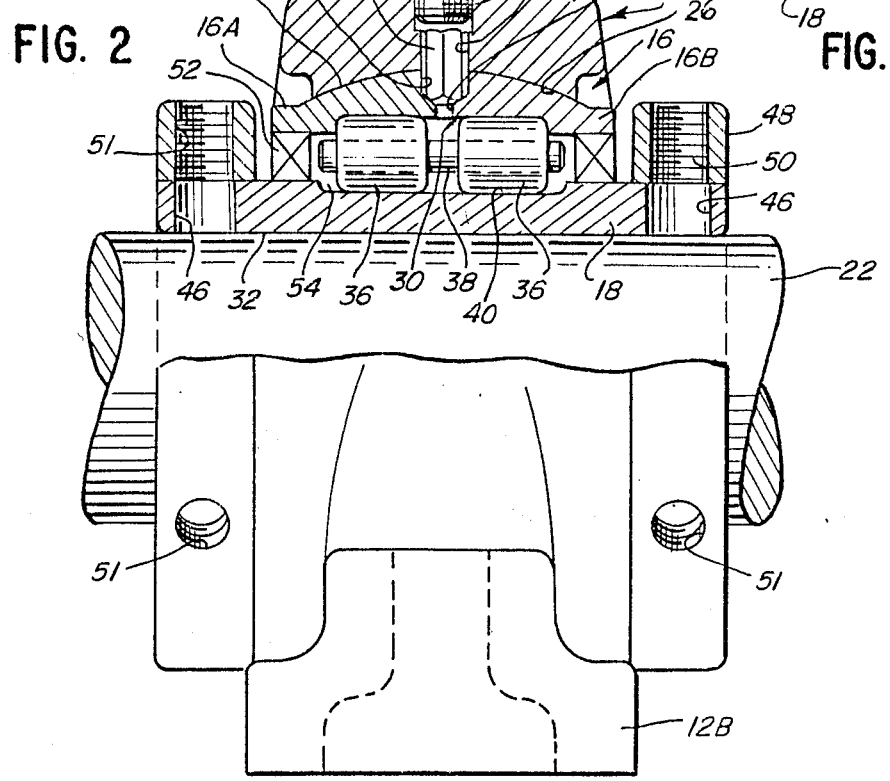

DOUBLE ROW CYLINDRICAL EXPANSION BEARING

BACKGROUND OF THE INVENTION

1. Field of the Invention

This invention relates to anti-friction bearings and particularly to roller bearings constructed to accommodate limited axial expansion of the shaft journaled in the bearing, and to be self-alinging, i.e., permitting some shaft misalignment therewith. Such expansion bearings are especially suitable for use in environments wherein shaft assemblies are subjected to extremes in temperature.

2. Discussion of Prior Art

U.S. Pat. Nos. 3,807,819; 3,845,999; and 3,850,485, granted respectively Apr. 30, 1974; Nov. 5, 1974; and Nov. 26, 1974 to George A. Zimmer et al, (all being related), disclose various structures permitting relative axial movement between the outer race of the bearing assembly and the shaft journaled in the bearing. The bearing structures depicted are self-aligning to accommodate some shaft misalignment relative to the bearing and its support.

U.S. Pat. No. 2,324,676, granted July 20, 1943 to J. P. Butterfield relates to a roller bearing (FIG. 1), the inner race A (crankshaft) of which has a reduced diameter portion, the length of which is not disclosed. The purpose of the invention is to choose materials for the sleeve D and cup C, so that clearances will be controlled under varying temperature conditions.

SUMMARY OF THE INVENTION

According to this invention, a double row cylindrical bearing comprises a housing or pillow block adapted to be secured to a support and constructed to receive a bearing assembly. The bearing assembly includes machined metal outer and inner races and a double row of cylindrical rollers therebetween, the rollers of each row being supported in spaced relationship by a roller retainer, generally constructed of a nylon and the like. The pillow block is generally cast metal with a machined, generally spherical surface therein which substantially matches the shape of the outer surface of the outer race or vice versa. The outer race is substantially cylindrical with a recessed cylindrical outer raceway therein, the outer raceway has an axial length equal to or just slightly more than the axial length of the double row of rollers, so that binding between the rollers and the raceway does not occur. The inner race is also cylindrical and is adapted to receive a rotatable shaft and to be connected therewith. The inner race is provided with the raceways are recessed and inner raceway of an axial length in excess of the axial length of the recessed outer raceway and the rollers to permit limited relative axial movement between the outer race and rollers and the inner race and the shaft to which the inner race is connected.

The inner race is connected to the shaft by means of set screws passing through openings in the inner race and threadably received in ring members surrounding the inner race. The inner race-shaft connections can be located at one or both ends of the inner race. Other connecting means can be used, such as the connecting means known as SKWEZLOC, which is described and claimed in U.S. Pat. Nos. 3,276,828 and 4,537,519.

The bearing assembly of this invention is provided with seal means between the races and also means to introduce lubricant into the space or roller cavity between the races. This lubrication system also comprises a locking pin which limits relative rotation between the outer race and the housing or pillow block while permitting a degree of self-alignment, i.e., it accommodates a limited amount of misalignment between the shaft and the bearing support.

The bearing insert, i.e., the inner and outer races and the rollers can be, and usually is, made as a cartridge, so that it can be easily replaced without requiring complete disassembly of the components for repair.

BRIEF DESCRIPTION OF THE DRAWINGS

FIG. 1 is an end view of a bearing constructed according to this invention;

FIG. 2 is a sectional view taken on line 2—2 of FIG. 1;

FIG. 3 is a partial sectional view of one type of bearing seal; and

FIG. 4 is a partial sectional view of an alternative bearing seal.

DETAILED DESCRIPTION OF THE PREFERRED EMBODIMENTS

In FIG. 1 of the drawings, there is illustrated a bearing 10 comprising a pillow block or housing 12, shown as being constructed to two parts 12A and 12B joined together by bolts 14, an outer race 16, an inner race 18, and locking means 20 by which the bearing 10 is connected to a rotatable shaft 22. The pillow block 12 is provided with bolt holes 24 to receive bolts, not shown, to fasten the bearing 10 to a support, also not shown. The details of the bearing 10 will be described with reference to the remaining figures of the drawing, using the same reference characters for corresponding parts.

Looking at FIG. 2, the pillow block 12 is provided with an interior spherical surface 26 which engages a complementary shaped surface 28 on the outer race 16. The outer race 16 is formed with a recessed cylindrical outer raceway 30, corresponding to the axial extent of two, spaced rows of rollers 36, the rollers being supported and spaced radially and axially by roller retainer 38.

The inner race 18 is formed with a bore 32 to receive the shaft 22 and with a recessed cylindrical inner raceway 40 of an axial length greater than the axial length of the outer raceway 30. The outer race 16 is formed of two parts 16A and 16B joined together, as by welding, when the bearing is assembled. The inner race is provided with one, and usually more, radially spaced openings 46 at each end. To lock the bearing 10 onto the shaft 22, locking rings 48 are used, each threadably receiving set screws 50 for passage through the openings 46 and forceably engaging the shaft 22. The set screws 50 are threadably received in openings 51.

At each end of the bearing 10, there is provided a seal means 52, the details of which are shown in FIGS. 3 and 4, to be described hereinafter. The seals 52 contain the lubricant introduced into the space or cavity 54 between the outer and inner races and in which the rollers are located. The seals also substantially prevent the ingress of dirt and debris into the cavity 54, and may be constructed to permit controlled purging of the lubricant from the cavity.

To introduce lubricant, usually a grease, into the cavity 54, lubrication passages 56 through the pillow block and 58 through the outer race are provided. A grease fitting 60 is threadably received in the passage 56 and an enlarged dimple 62 is provided in the outer surface 28 of the outer race. A locking pin 64 is received in the passage 56 and extends into the dimple 62. The locking pin 64, while permitting the passage of lubricant therearound and into the cavity 54, substantially prevents relative rotation between the pillow block 12 and the outer race 16, yet permits the bearing to accommodate limited misalignment of the shaft relative to the bearing support.

The seal means 52 can take at least one of the forms illustrated in FIGS. 3 and 4. FIG. 3 illustrates a felt seal comprising a pair of flingers 66 and 68 with a felt ring 70 therebetween, the construction being well know in the art. FIG. 4 illustrates a lip contact seal which comprises a supported resilient lip member 72 contacting the rotatable inner race. In the event excess grease pressure is exerted, lubricant will be forced axially outwardly from the lip seals thus purging the cavity 54.

The bearing of this invention is especially suitable for installations where (a) bearing supports are not rigid; (b) significant temperature differentials are expected between shafts and mounting structures; and (c) the shaft is unusually long.

The appended claims are intended to cover all reasonable equivalents and are to be interpreted as broadly as the prior art will permit.

I claim:

1. A double row cylindrical axial expansion bearing comprising:
   a housing or pillow block;
   an outer race having a recessed generally cylindrical outer raceway therein of a first axial length;
   a cylindrical inner race having a recessed generally cylindrical inner raceway therein of a second axial length, said recessed inner raceway being axially longer than said recessed outer raceway;
   said inner race having a generally cylindrical bore adapted to surround a rotary shaft and to be connected therewith for rotation;
   a double row of generally cylindrical rollers between and in rolling engagement with said recessed inner and outer raceways; and
   a retainer for retaining said rollers in each row radially spaced from each other and each row axially spaced from the other row;
   the axial length of said rollers in said double row being substantially equal to the axial length of said recessed outer raceway and smaller than the axial length of said recessed inner raceway thereby accommodating axial expansion of said rotary shaft relative to said rollers and said outer race and housing.

2. A double row expansion bearing as recited in claim 1, further comprising means substantially preventing relative rotation between said outer race and said housing while permitting controlled self-aligning relative to the shaft.

3. A double row expansion bearing as recited in claim 1, further comprising means connecting said inner race to a shaft.

4. A double row expansion bearing as recited in claim 1, further comprising seal means positioned between said races outwardly of said rollers to retain lubricant between said races and to prevent the ingress of dirt and debris therebetween.

5. A double row expansion bearing as recited in claim 1, further comprising means constructed and arranged to provide a means and a path for the introduction of lubricant to a location between said races and around said rollers.

* * * * *